(12) United States Patent
Curcio et al.

(10) Patent No.: US 9,253,105 B2
(45) Date of Patent: Feb. 2, 2016

(54) METHODS AND APPARATUSES FOR FACILITATING DETERMINATION OF A STATE OF A RECEIVER BUFFER

(75) Inventors: Igor D. Curcio, Tampere (FI); Jörg Ott, Espoo (FI); Varun Singh, Espoo (FI)

(73) Assignee: Nokia Technologies Oy, Espoo (FI)

( * ) Notice: Subject to any disclaimer, the term of this patent is extended or adjusted under 35 U.S.C. 154(b) by 561 days.

(21) Appl. No.: 12/982,190

(22) Filed: Dec. 30, 2010

(65) Prior Publication Data
US 2012/0170469 A1 Jul. 5, 2012

(51) Int. Cl.
- *H04B 7/04* (2006.01)
- *H04L 12/835* (2013.01)
- *H04L 1/18* (2006.01)
- *H04L 29/14* (2006.01)
- *H04L 12/801* (2013.01)

(52) U.S. Cl.
CPC .............. *H04L 47/30* (2013.01); *H04B 7/0417* (2013.01); *H04L 1/1874* (2013.01); *H04L 47/10* (2013.01); *H04L 69/40* (2013.01)

(58) Field of Classification Search
CPC ..... H04L 47/30; H04L 65/80; H04L 65/4092; H04L 1/1835; H04L 1/1874; H04L 47/10; H04L 69/40; H04W 28/18; H04W 52/267; H04J 3/0667; H04B 7/0417
See application file for complete search history.

(56) References Cited

U.S. PATENT DOCUMENTS

| | | | |
|---|---|---|---|
| 2003/0152032 A1* | 8/2003 | Yanagihara | H04N 21/234354 370/236.1 |
| 2004/0186877 A1* | 9/2004 | Wang | H04L 29/06027 709/200 |
| 2005/0254427 A1 | 11/2005 | Leon et al. | |
| 2007/0124784 A1* | 5/2007 | Shon | H04L 12/1868 725/105 |
| 2008/0091838 A1 | 4/2008 | Miceli | |
| 2008/0120424 A1 | 5/2008 | Deshpande | |
| 2008/0259799 A1* | 10/2008 | van Beek | H04L 47/2416 370/235 |
| 2010/0316066 A1* | 12/2010 | Leung | H04N 21/42209 370/468 |

OTHER PUBLICATIONS

"3GPP TS 26.234 V9.4.0 (Sep. 2010): 3rd Generation Partnership Project; Technical Specification Group Services and System Aspects; Transparent end-to-end Packet-switched Streaming Service (PSS); Protocols and Codecs (Release 9)," [online] [retrieved Oct. 18, 2010]. Retrieved from the Internet: <http://www.quintillion.co.jp/3GPP/Specs/26234-940pdf>. 187 pages.

Friedman et al., "RTP Control Protocol Extended Reports (RTCP XR)," [online] [retrieved Oct. 18, 2010]. Retrieved from the Internet: <http://www.rfc-editor.org/rfc/rfc3611.txt>. 55 pages.

Schulzrinne et al., "RTP: A Transport Protocol for Real-Time Applications," [online] [retrieved Oct. 18, 2010]. Retrieved from the Internet: <http://citeseerx.ist.psu.edu/viewdoc/download?doi=10.1.1.65.5767&rep=rep1&type=pdf>. 89 pages.

International Search Report and Written Opinion from International Application No. PCT/IB2011/054613, dated Apr. 18, 2012.

* cited by examiner

Primary Examiner — Andrew Chriss
Assistant Examiner — Salvador E Rivas
(74) Attorney, Agent, or Firm — Alston & Bird LLP

(57) ABSTRACT

Methods and apparatuses are provided for facilitating determination of a state of a receiver buffer. A method may include receiving, at a first time, a data packet of a data stream transmitted by a sending apparatus. The method may further include generating, at a second time, a periodically generated receiver reporting message. The method may additionally include determining an interval time defining an interval between the first time and the second time. The method may also comprise causing an indication of the interval time to be sent to the sending apparatus. Corresponding apparatuses are also provided.

36 Claims, 9 Drawing Sheets

METHODS AND APPARATUSES FOR FACILITATING DETERMINATION OF A STATE OF A RECEIVER BUFFER

TECHNOLOGICAL FIELD

Example embodiments of the present invention relate generally to communications technology and, more particularly, relate to methods and apparatuses for facilitating determination of a state of a receiver buffer.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

The expansion of networks and concurrent evolution of mobile computing devices and other networked computing devices has resulted in a large base of devices having sufficient processing power, storage space, and network bandwidth to enable the transfer and playback of increasingly complex digital media files. Accordingly, Internet television, video sharing, other video streaming, and audio streaming are gaining widespread popularity.

BRIEF SUMMARY

Systems, methods, apparatuses, and computer program products are herein provided for facilitating determination of a state of a receiver buffer. Systems, methods, apparatuses, and computer program products in accordance with various embodiments may provide several advantages to computing devices, computing device users, network operators, and content providers. In this regard, some example embodiments provide receiving apparatuses configured to determine a time interval between a first time at which a data packet in a data stream was received and a second time at which a receiver reporting message was generated. The receiving apparatus of such example embodiments may be further configured to signal the determined time interval to a sending apparatus that is sending the data stream to the receiving apparatus. A sending apparatus according to such example embodiments may be configured to determine a state of a receiver buffer in which received data packets of the data stream are buffered. The sending apparatus of such example embodiments may be further configured to control transmission of the data stream based at least in part on the determined receiver buffer state to ensure that a buffer underflow does not occur. Accordingly, a user of the receiving apparatus may benefit, in embodiments wherein the data stream comprises a media stream, from an uninterrupted play out of the media, thus enhancing the quality of the media perceived by the user.

In a first example embodiment, a method is provided, which comprises receiving, at a first time, a data packet of a data stream transmitted by a sending apparatus. The method of this example embodiment further comprises generating, at a second time, a periodically generated receiver reporting message. The method of this example embodiment also comprises determining an interval time defining an interval between the first time and the second time. The method of this example embodiment additionally comprises causing an indication of the interval time to be sent to the sending apparatus.

In another example embodiment, an apparatus comprising at least one processor and at least one memory storing computer program code is provided. The at least one memory and stored computer program code are configured, with the at least one processor, to cause the apparatus of this example embodiment to at least receive, at a first time, a data packet of a data stream transmitted by a sending apparatus. The at least one memory and stored computer program code are configured, with the at least one processor, to further cause the apparatus of this example embodiment to generate, at a second time, a periodically generated receiver reporting message. The at least one memory and stored computer program code are configured, with the at least one processor, to additionally cause the apparatus of this example embodiment to determine an interval time defining an interval between the first time and the second time. The at least one memory and stored computer program code are configured, with the at least one processor, to also cause the apparatus of this example embodiment to cause an indication of the interval time to be sent to the sending apparatus.

In another example embodiment, a computer program product is provided. The computer program product of this example embodiment includes at least one computer-readable storage medium having computer-readable program instructions stored therein. The program instructions of this example embodiment comprise program instructions configured to receive, at a first time, a data packet of a data stream transmitted by a sending apparatus. The program instructions of this example embodiment further comprise program instructions configured to generate, at a second time, a periodically generated receiver reporting message. The program instructions of this example embodiment additionally comprise program instructions configured to determine an interval time defining an interval between the first time and the second time. The program instructions of this example embodiment also comprise program instructions configured to cause an indication of the interval time to be sent to the sending apparatus.

In another example embodiment, an apparatus is provided that comprises means for receiving, at a first time, a data packet of a data stream transmitted by a sending apparatus. The apparatus of this example embodiment further comprises means for generating, at a second time, a periodically generated receiver reporting message. The apparatus of this example embodiment also comprises means for determining an interval time defining an interval between the first time and the second time. The apparatus of this example embodiment additionally comprises means for causing an indication of the interval time to be sent to the sending apparatus.

In another example embodiment, a method is provided, which comprises receiving an indication of an interval time sent by a receiving apparatus. The interval time of this example embodiment defines an interval between a first time at which a data packet of a data stream was received by the receiving apparatus and a second time when a periodically generated receiver reporting message was generated by the receiving apparatus. The method of this example embodiment further comprises using the interval time to determine a state of a receiver buffer in which received data packets of the data stream are buffered by the receiving apparatus.

In another example embodiment, an apparatus comprising at least one processor and at least one memory storing computer program code is provided. The at least one memory and stored computer program code are configured, with the at least one processor, to cause the apparatus of this example embodiment to at least receive an indication of an interval time sent by a receiving apparatus. The interval time of this example embodiment defines an interval between a first time at which a data packet of a data stream was received by the receiving apparatus and a second time when a periodically generated receiver reporting message was generated by the receiving apparatus. The at least one memory and stored computer program code are configured, with the at least one processor, to further cause the apparatus of this example embodiment to use the interval time to determine a state of a receiver buffer in which received data packets of the data stream are buffered by the receiving apparatus.

In another example embodiment, a computer program product is provided. The computer program product of this example embodiment includes at least one computer-readable storage medium having computer-readable program instructions stored therein. The program instructions of this example embodiment comprise program instructions configured to receive an indication of an interval time sent by a receiving apparatus. The interval time of this example embodiment defines an interval between a first time at which a data packet of a data stream was received by the receiving apparatus and a second time when a periodically generated receiver reporting message was generated by the receiving apparatus. The program instructions of this example embodiment further comprise program instructions configured to use the interval time to determine a state of a receiver buffer in which received data packets of the data stream are buffered by the receiving apparatus.

In another example embodiment, an apparatus is provided that comprises means for receiving an indication of an interval time sent by a receiving apparatus. The interval time of this example embodiment defines an interval between a first time at which a data packet of a data stream was received by the receiving apparatus and a second time when a periodically generated receiver reporting message was generated by the receiving apparatus. The apparatus of this example embodiment further comprises means for using the interval time to determine a state of a receiver buffer in which received data packets of the data stream are buffered by the receiving apparatus.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
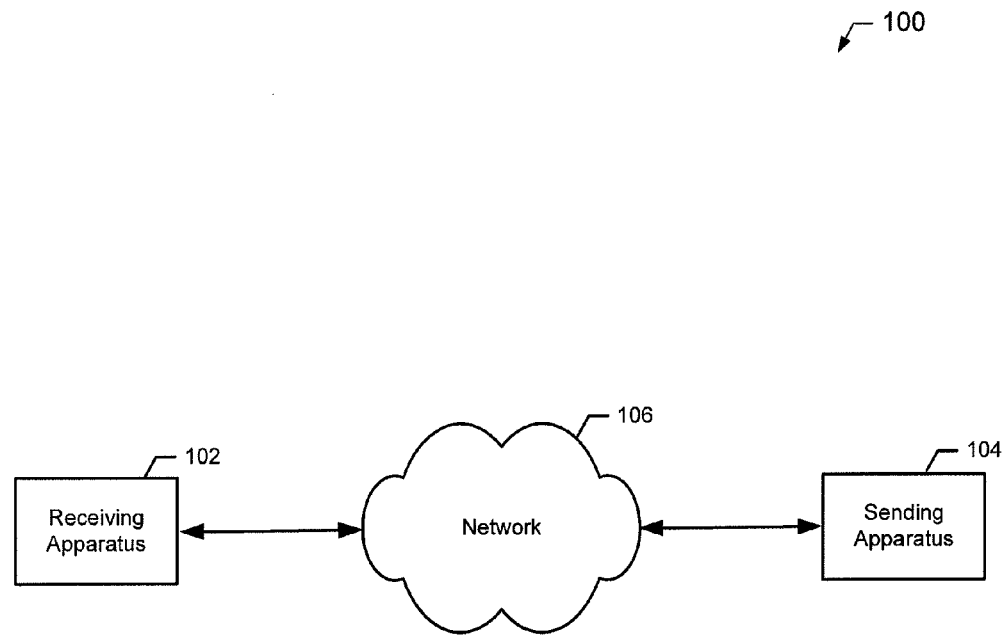
FIG. 1 illustrates a system for facilitating determination of a state of a receiver buffer according to an example embodiment.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of computer-readable media include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Data, such as media data may be streamed from a sending apparatus to a receiving apparatus over a network connection. Media data may be streamed in a real time transmission. Such real time media may include, but is not limited to, audio media, video media, audio/video media, timed text, subtitles, some combination thereof and/or the like. In some network environments, such as in Internet Protocol (IP)-based environments, media transmission may be impacted by packet losses and/or by the effect of statistical multiplexing (or queuing) along a transmission path, which may lead to jitter and may also incur packet losses. Further, in instances in which error-prone links (e.g., a wireless transmission medium, wireless link, wireless network, and/or the like) are used for transmission of a media stream, packets may also be lost due to bit errors. Additionally, as a result of packet losses and/or due to other constraints, the available bit rate for parts or all of a path may vary dynamically. Moreover, parts of or the entire path may change dynamically, which may result in a change in the bit rate and other communication characteristics. These changes may occur dynamically, the dynamics occurring at any timescales from remaining constant to variation at sub-second intervals.

Apparatuses (e.g., sending apparatuses) and/or applications (e.g., IP-based applications) streaming media or other data in accordance with some example embodiments may implement adaptive behavior to cope with such dynamic networking conditions. Such adaptive behavior may include, for example, 1) transmission rate control, such as by adjusting the transmission rate to match what the path(s) to the destination receiving apparatus appear to be capable of supporting at any given time instant; 2) encoding rate control, such as by adjusting the encoding rate of the media (and keeping constant the transmission rate) to match what the path(s) to the destination appear to be capable of supporting at any time instant; 3) a combination of transmission rate control and encoding rate control; and 4) error control, such as estimating what information is needed at the receiving apparatus to reproduce the communicated content to a certain degree (e.g., to match a certain quality level, temporal or spatial resolution, and/or the like).

Some example embodiments facilitate determination by a sending apparatus of a state of a receiver buffer in a receiving apparatus. This determined state may be used by the sending apparatus in accordance with some example embodiments as a measure for controlling transmission of a data stream or otherwise implementing adaptive behavior. Accordingly, at least a threshold level of quality may be maintained even as network conditions may evolve.

Referring now to FIG. 1, FIG. 1 illustrates a block diagram of a system 100 for facilitating determination of a state of a receiver buffer according to an example embodiment. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for facilitating determination of a state of a receiver buffer, numerous other configurations may also be used to implement embodiments of the present invention.

In at least some embodiments, the system 100 includes a receiving apparatus 102 and sending apparatus 104. The receiving apparatus 102 and sending apparatus 104 may be configured to communicate over the network 106. The network 106 may comprise one or more wireless networks (for example, a cellular network, a public land mobile network, wireless local area network, wireless personal area network, wireless metropolitan area network, and/or the like), one or more wireline networks, or some combination thereof, and in some embodiments comprises at least a portion of the internet.

The receiving apparatus 102 may be embodied as any computing device, such as, for example, a desktop computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), a chipset, an apparatus comprising a chipset, any combination thereof, and/or the like. In this regard, the receiving apparatus 102 may be embodied as any computing device configured to receive a data stream transmitted by the sending apparatus 104 over the network 106.

The sending apparatus 104 may be embodied as one or more servers, a server cluster, a cloud computing infrastructure, one or more desktop computers, one or more laptop computers, one or more mobile computers, one or more network nodes, multiple computing devices in communication with each other, a desktop computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), a chipset, an apparatus comprising a chipset, any combination thereof, and/or the like. More particularly, the sending apparatus 104 may comprise any computing device or plurality of computing devices configured to transmit a data stream to a receiving apparatus 102 over the network 106.

Figure 2:
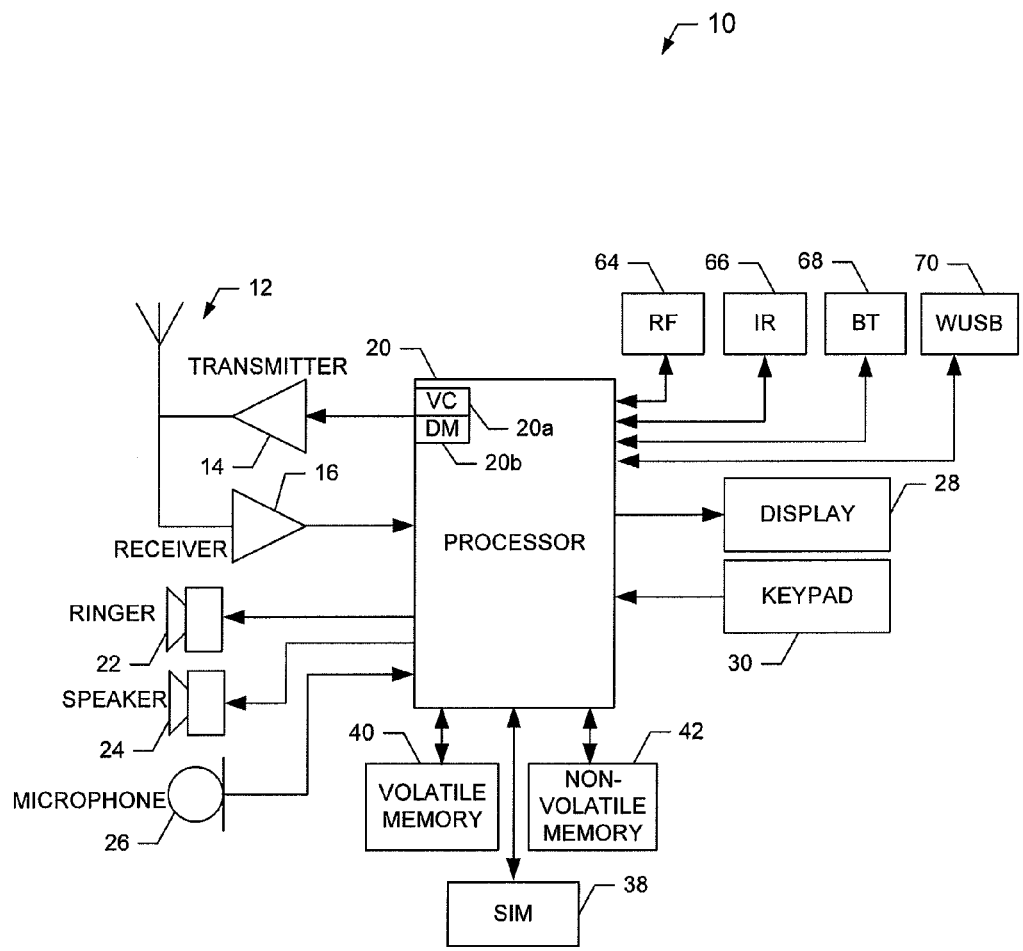
FIG. 2 is a schematic block diagram of a mobile terminal according to an example embodiment.

In an example embodiment, one or more of the receiving apparatus 102 or the sending apparatus 104 is embodied as a mobile terminal, such as that illustrated in FIG. 2. In this regard, FIG. 2 illustrates a block diagram of a mobile terminal 10 representative of one embodiment of a receiving apparatus 102 and/or of a sending apparatus 104. It should be understood, however, that the mobile terminal 10 illustrated and hereinafter described is merely illustrative of one type of a receiving apparatus 102 and/or of a sending apparatus 104 that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP), a Real-Time Transmission Protocol (RTP), and/or the like to transmit and receive content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
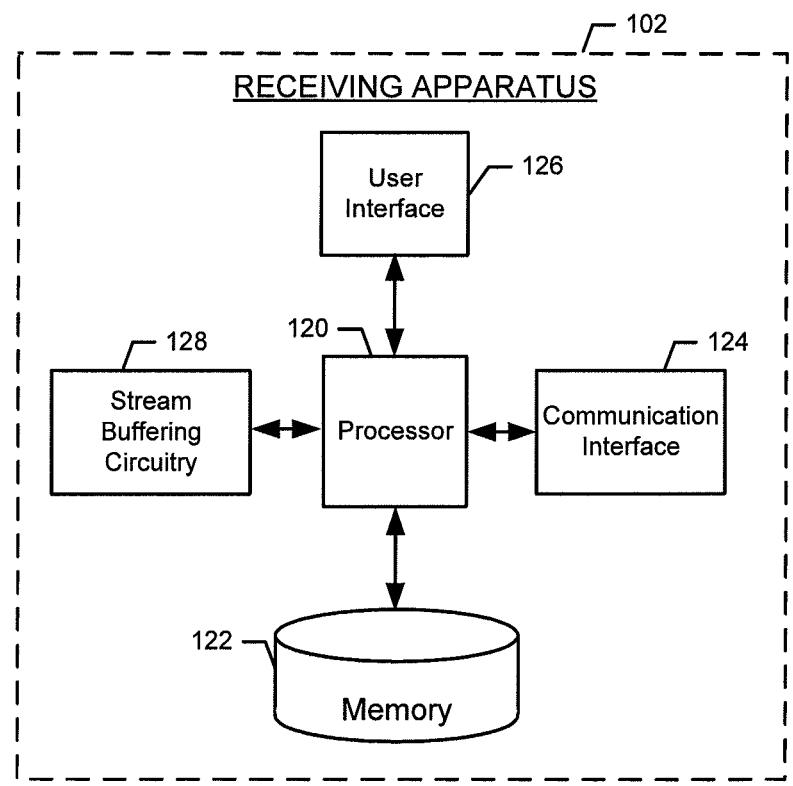
FIG. 3 illustrates a block diagram of a receiving apparatus according to an example embodiment.

Referring now to FIG. 3, FIG. 3 illustrates a block diagram of a receiving apparatus 102 according to an example embodiment. In the example embodiment, the receiving apparatus 102 includes various means for performing the various functions herein described. These means may comprise one or more of a processor 120, memory 122, communication interface 124, user interface 126, or stream buffering circuitry 128. The means of the receiving apparatus 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 122) that is executable by a suitably configured processing device (for example, the processor 120), or some combination thereof.

In some example embodiments, one or more of the means illustrated in FIG. 3 may be embodied as a chip or chip set. In other words, the receiving apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, user interface 126, and/or stream buffering circuitry 128 may be embodied as a chip or chip set. The receiving apparatus 102 may therefore, in some example embodiments, be configured to implement embodiments of the present invention on a single chip or as a single "system on a chip." As another example, in some example embodiments, the receiving apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 120 comprises a plurality of processors. The plurality of processors may be in operative communication with each other and may be collectively configured to perform one or more functionalities of the receiving apparatus 102 as described herein. The plurality of processors may be embodied on a single computing device or distributed across a plurality of computing devices collectively configured to function as the receiving apparatus 102. In embodiments wherein the receiving apparatus 102 is embodied as a mobile terminal 10, the processor 120 may be embodied as or comprise the processor 20. In some example embodiments, the processor 120 is configured to execute instructions stored in the memory 122 or otherwise accessible to the processor 120. These instructions, when executed by the processor 120, may cause the receiving apparatus 102 to perform one or more of the functionalities of the receiving apparatus 102 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 3 as a single memory, the memory 122 may comprise a plurality of memories. The plurality of memories may be embodied on a single computing device or may be distributed across a plurality of computing devices collectively configured to function as the receiving apparatus 102. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the receiving apparatus 102 is embodied as a mobile terminal 10, the memory 122 may comprise the volatile memory 40 and/or the non-volatile memory 42. The memory 122 may be configured to store information, data, applications, instructions, or the like for enabling the receiving apparatus 102 to carry out various functions in accordance with various example embodiments. For example, in some example embodiments, the memory 122 is configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the stream buffering circuitry 128 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. In an example embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the receiving apparatus 102 and one or more computing devices or computing resources may be in communication. As an example, the communication interface 124 may be configured to enable communication between the receiving apparatus 102 and the sending apparatus 104 over a network (for example, the network 106). The communication interface 124 may additionally be in communication with the memory 122, user interface 126, and/or stream buffering circuitry 128, such as via a bus.

The user interface 126 may be in communication with the processor 120 to receive an indication of a user input and/or to provide an audible, visual, mechanical, or other output to a user. As such, the user interface 126 may include, for example, a keyboard, a mouse, a joystick, a display, a touch screen display, a microphone, a speaker, and/or other input/output mechanisms. In embodiments wherein the user interface 126 comprises a touch screen display, the user interface 126 may additionally be configured to detect and/or receive an indication of a touch gesture or other input to the touch screen display. The user interface 126 may be in communication with the memory 122, communication interface 124, and/or stream buffering circuitry 128, such as via a bus.

The stream buffering circuitry 128 may be embodied as various means, such as circuitry, hardware, a computer program product comprising computer readable program instructions stored on a computer readable medium (for example, the memory 122) and executed by a processing device (for example, the processor 120), or some combination thereof and, in some embodiments, is embodied as or otherwise controlled by the processor 120. In embodiments wherein the stream buffering circuitry 128 is embodied separately from the processor 120, the stream buffering circuitry 128 may be in communication with the processor 120. The stream buffering circuitry 128 may further be in communication with one or more of the memory 122, communication interface 124, or user interface 126, such as via a bus.

Figure 4:
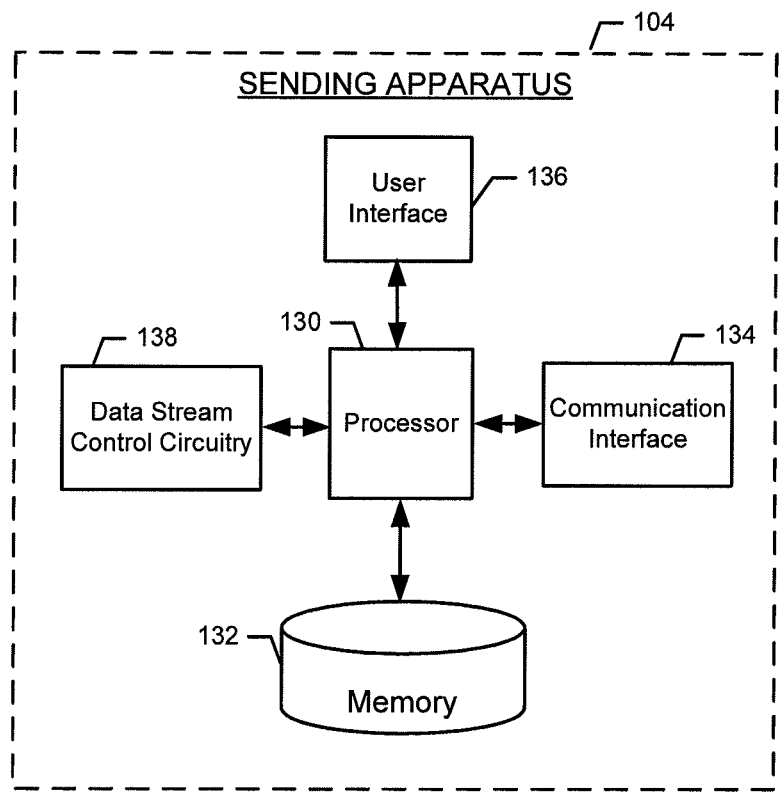
FIG. 4 illustrates a block diagram of a sending apparatus according to an example embodiment.

Referring now to FIG. 4, FIG. 4 illustrates a block diagram of a sending apparatus 104 according to an example embodiment. In the example embodiment, the sending apparatus 104 includes various means for performing the various functions herein described. These means may comprise one or more of a processor 130, memory 132, communication interface 134, user interface 136, or data stream control circuitry 138. The means of the sending apparatus 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 132) that is executable by a suitably configured processing device (for example, the processor 130), or some combination thereof.

In some example embodiments, one or more of the means illustrated in FIG. 4 may be embodied as a chip or chip set. In other words, the sending apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 130, memory 132, communication interface 134, user interface 136, and/or data stream control circuitry 138 may be embodied as a chip or chip set. The sending apparatus 104 may therefore, in some example embodiments, be configured to implement embodiments of the present invention on a single chip or as a single "system on a chip." As another example, in some example embodiments, the sending apparatus 104 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 130 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some embodiments the processor 130 comprises a plurality of processors. The plurality of processors may be in operative communication with each other and may be collectively configured to perform one or more functionalities of the sending apparatus 104 as described herein. The plurality of processors may be embodied on a single computing device or distributed across a plurality of computing devices collectively configured to function as the sending apparatus 104. In embodiments wherein the sending apparatus 104 is embodied as a mobile terminal 10, the processor 130 may be embodied as or comprise the processor 20. In some example embodiments, the processor 130 is configured to execute instructions stored in the memory 132 or otherwise accessible to the processor 130. These instructions, when executed by the processor 130, may cause the sending apparatus 104 to perform one or more of the functionalities of the sending apparatus 104 as described herein. As such, whether configured by hardware or software methods, or by a combination thereof, the processor 130 may comprise an entity capable of performing operations according to embodiments of the present invention while configured accordingly. Thus, for example, when the processor 130 is embodied as an ASIC, FPGA or the like, the processor 130 may comprise specifically configured hardware for conducting one or more operations described herein. Alternatively, as another example, when the processor 130 is embodied as an executor of instructions, such as may be stored in the memory 132, the instructions may specifically configure the processor 130 to perform one or more algorithms and operations described herein.

The memory 132 may comprise, for example, volatile memory, non-volatile memory, or some combination thereof. In this regard, the memory 132 may comprise a non-transitory computer-readable storage medium. Although illustrated in FIG. 4 as a single memory, the memory 132 may comprise a plurality of memories. The plurality of memories may be embodied on a single computing device or may be distributed across a plurality of computing devices collectively configured to function as the sending apparatus 104. In various example embodiments, the memory 132 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the sending apparatus 104 is embodied as a mobile terminal 10, the memory 132 may comprise the volatile memory 40 and/or the non-volatile memory 42. The memory 132 may be configured to store information, data, applications, instructions, or the like for enabling the sending apparatus 104 to carry out various functions in accordance with various example embodiments. For example, in some example embodiments, the memory 132 is configured to buffer input data for processing by the processor 130. Additionally or alternatively, the memory 132 may be configured to store program instructions for execution by the processor 130. The memory 132 may store information in the form of static and/or dynamic information. This stored information may be stored and/or used by the data stream control circuitry 138 during the course of performing its functionalities.

The communication interface 134 may be embodied as any device or means embodied in circuitry, hardware, a computer program product comprising computer readable program instructions stored on a computer readable medium (for example, the memory 132) and executed by a processing device (for example, the processor 130), or a combination thereof that is configured to receive and/or transmit data from/to another computing device. In an example embodiment, the communication interface 134 is at least partially embodied as or otherwise controlled by the processor 130. In this regard, the communication interface 134 may be in communication with the processor 130, such as via a bus. The communication interface 134 may include, for example, an antenna, a transmitter, a receiver, a transceiver and/or supporting hardware or software for enabling communications with one or more remote computing devices. The communication interface 134 may be configured to receive and/or transmit data using any protocol that may be used for communications between computing devices. In this regard, the communication interface 134 may be configured to receive and/or transmit data using any protocol that may be used for transmission of data over a wireless network, wireline network, some combination thereof, or the like by which the sending apparatus 104 and one or more computing devices or computing resources may be in communication. As an example, the communication interface 134 may be configured to enable communication between the sending apparatus 104 and the receiving apparatus 102 over a network (for example, the network 106). The communication interface 134 may additionally be in communication with the memory 132, user interface 136, and/or data stream control circuitry 138, such as via a bus.

The user interface 136 may be in communication with the processor 130 to receive an indication of a user input and/or to provide an audible, visual, mechanical, or other output to a user. As such, the user interface 136 may include, for example, a keyboard, a mouse, a joystick, a display, a touch screen display, a microphone, a speaker, and/or other input/output mechanisms. In embodiments wherein the user interface 136 comprises a touch screen display, the user interface 136 may additionally be configured to detect and/or receive an indication of a touch gesture or other input to the touch screen display. In embodiments wherein the sending apparatus 104 is embodied as one or more servers, aspects of the user interface 136 may be more limited, or the user interface 136 may even be eliminated entirely. The user interface 136 may be in communication with the memory 132, communication interface 134, and/or data stream control circuitry 138, such as via a bus.

The data stream control circuitry 138 may be embodied as various means, such as circuitry, hardware, a computer program product comprising computer readable program instructions stored on a computer readable medium (for example, the memory 132) and executed by a processing device (for example, the processor 130), or some combination thereof and, in some embodiments, is embodied as or otherwise controlled by the processor 130. In embodiments wherein the data stream control circuitry 138 is embodied separately from the processor 130, the data stream control circuitry 138 may be in communication with the processor 130. The data stream control circuitry 138 may further be in communication with one or more of the memory 132, communication interface 134, or user interface 136, such as via a bus.

It will be appreciated that reference to the receiving apparatus 102 as a "receiving" apparatus and to a sending apparatus 104 as a "sending" apparatus is for illustrative purposes of their respective roles in an instance in which a data stream is transmitted from the sending apparatus 104 to the receiving apparatus 102 in accordance with any of the example embodiments described herein. As such, it will be appreciated that in some example embodiments, a receiving apparatus 102 may be configured to transmit a data stream and/or a sending apparatus 104 may be configured to receive a data stream. In embodiments wherein the receiving apparatus 102 is further configured to transmit a data stream, the receiving apparatus 102 may further comprise data stream control circuitry 138 and/or may otherwise be configured to perform one or more functionalities attributed to the data stream control circuitry 138 and/or to the sending apparatus 104 in accordance with one or more example embodiments disclosed herein. Similarly, in embodiments wherein the sending apparatus 104 is further configured to receive a data stream, the sending apparatus 104 may further comprise stream buffering circuitry 128 and/or may otherwise be configured to perform one or more functionalities attributed to the stream buffering circuitry 128 and/or to the receiving apparatus 102 in accordance with one or more example embodiments disclosed herein.

In accordance with some example embodiments, the data stream control circuitry 138 may be configured to cause transmission of a data stream (e.g., via the communication interface 134) to a receiving apparatus 102. The data stream may, for example comprise a media stream. Streamed media data of a media stream in accordance with various example embodiments may comprise streaming audio, streaming video, timed text, subtitles, some combination thereof, or the like. However, it will be appreciated, that a data stream may comprise any type of data that may be streamed and is not limited to streaming of media data. As such, where example embodiments are described herein with respect to media streaming, media streaming is used for illustrative purposes and not by way of limitation.

In some example embodiments, a data stream transmitted by the sending apparatus 104 may comprise a real time data stream. In such example embodiments, Real Time Protocol (RTP), Real Time Control Protocol (RTCP), and/or the like may be used for transmission of the real time data stream for transmission and control of the data stream from the sending apparatus 104 to the receiving apparatus 102. However, it will be appreciated that RTP and RTCP are provided merely as example protocols that may be used for real time streaming in accordance with some example embodiments, and not by way of limitation. As such, where various example embodiments are described to use RTP and/or RTCP, as well as messaging and control protocols used in either of those respective protocols, it is likewise by way of example and not by way of limitation. Accordingly, other real time protocols and real ay be readily substituted for RTP and/or RTCP in accordance with various example embodiments.

The stream buffering circuitry 128 may be configured to buffer data packets received in a data stream in a buffer prior to consuming the data packets. In embodiments wherein the data packets comprise media packets, consuming the media packets may comprise rendering or otherwise playing out the media packets. For example, a media packet may be consumed by a decoder, which may be implemented on the receiving apparatus 102, and which may be configured to decode media packets so that they may be played out. Accordingly, the buffer may comprise a queue in which data packets are temporarily buffered upon receipt and prior to being consumed.

Figure 5:
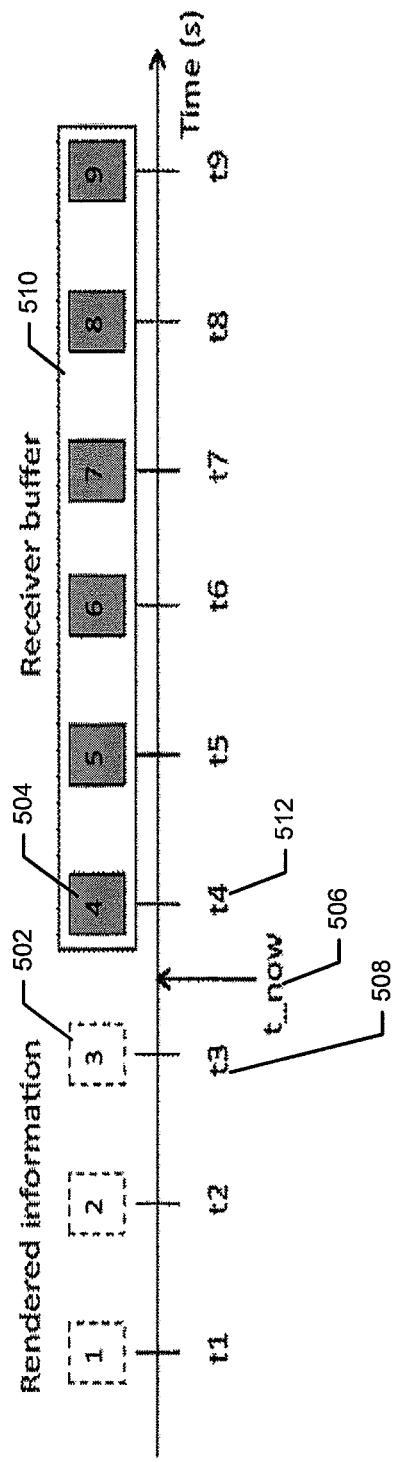
FIG. 5 illustrates an example receiver buffer according to an example embodiment.

Referring now to FIG. 5, FIG. 5 illustrates an example receiver buffer, such as may be implemented by the stream buffering circuitry 128, according to an example embodiment. In the example illustrated in FIG. 5, the receiving apparatus 102 has received nine information units (e.g., data packets), including the information unit 502 and the information unit 504, in the data stream. The information units are scheduled for rendering (e.g., consumption) according to a defined timeline. FIG. 5 illustrates a receiver state at the time t_now 506. Three information units (e.g., units 1, 2, and 3) were already rendered at times t1, t2, and t3, respectively. In this regard, the information unit 502 was rendered at time t3 508. Six information units (e.g., units 4, 5, 6, 7, 8, and 9) are buffered in the receiver buffer 510 and are scheduled to be rendered at times t4, . . . , t9, respectively. In this regard, the information unit 504 is buffered in the buffer 510 and is scheduled to be rendered at time t4 512. It will be appreciated that the example illustrated in FIG. 5 is not intended to make any assumption about the form, size, representation, labeling, numbering, and/or the like of the information units. Further, in the example of FIG. 5, no information units were lost in transmission. However, it will be appreciated that FIG. 5 is only an example and packets may, in some instances, be lost in transmission from the sending apparatus 104 to the receiving apparatus 102.

The stream buffering circuitry 128 may be configured to keep track of a status of received and consumed data packets in a data stream. Accordingly, in the example of FIG. 5, the stream buffering circuitry 128 may know the status of the received, buffered, and rendered information units. The stream buffering circuitry 128 may be configured to inform the sending apparatus 104 of at least some state information of received packets and/or of the receiver buffer. For example, the stream buffering circuitry 128 may be configured to inform the sending apparatus 104 about which data packets have been received by the receiving apparatus 102 at a given point in time, when a particular data packet was received by the receiving apparatus 102, when a data packet or information contained therein will be consumed (e.g., played out) by the receiving apparatus 102, how long a data packet or information contained therein is queued in a receiver buffer prior to being consumed (e.g., played out), how many data packets are still queued (e.g., in the receiver buffer) to be consumed (e.g., played out), and/or the like.

The data stream control circuitry 138 may be configured to receive state information sent by the receiving apparatus 102 and use the state information to determine a state of the receiver buffer. The data stream control circuitry 138 may use the determined state of the receiver buffer to adjust transmission of a data stream to the receiving apparatus 102. In this regard, the data stream control circuitry 138 may use a determined state of the receiver buffer to perform adaptive functions to adapt transmission of the data stream to changing conditions of the network 106. For example, the data stream control circuitry 138 may use a determined state of the receiver buffer as a measure for providing at least a threshold bit rate to enable a consistent consumption (e.g., play out) of data packets at the receiving apparatus 102. As such, a user of the receiving apparatus 102 may, for example, be less likely to encounter pauses or other delays in play out of a media stream.

The stream buffering circuitry 128 may inform the sending apparatus 104 of state information in one or more receiver reporting messages that may be sent to the sending apparatus 104. One example type of receiver reporting message that may be generated and sent to the sending apparatus 104 is an RTCP receiver report (RR). This message may, for example, enable the stream buffering circuitry 128 to communicate information about the received and lost packets to the sending apparatus 104. Taking the example in FIG. 5 and assuming that no duplicate packets were received, the stream buffering circuitry 128 may inform the sending apparatus 104 at t_now that the highest packet number received was 9 and that no packet loss occurred. The stream buffering circuitry 128 may further include information in an RTCP receiver report that may allow the data stream control circuitry 138 to determine the round-trip time (RTT), the observed jitter, and/or the like. It will be appreciated, however, that inclusion of this state information in an RTCP receiver report is discussed merely by way of example and not by way of limitation. As such, the stream buffering circuitry 128 may be configured to include such state information in a receiver reporting message that may be used in addition to or in lieu of an RTCP receiver report.

Another example type of receiver reporting message that may be generated and sent to the sending apparatus 104 is an RTCP eXtended report (XR). This message may, for example, enable the stream buffering circuitry 128 to communicate information about the identities lost packets to the sending apparatus 104, rather than just an indication of a number and/or fraction of lost packets. The stream buffering circuitry 128 may additionally or alternatively include an indication of receipt times for packets in an RTCP XR. Accordingly, the data stream control circuitry 138 may be enabled to determine a reception status of the data stream. In some example embodiments, the stream buffering circuitry 138 may be configured to generate an RTCP XR after every $n^{th}$ packet. It will be appreciated, however, that inclusion of this state information in an RTCP XR is discussed merely by way of example and not by way of limitation. As such, the stream buffering circuitry 128 may be configured to include such state information in a receiver reporting message that may be used in addition to or in lieu of an RTCP XR.

A further example type of receiver reporting message that may be generated and sent to the sending apparatus 104 is a Next Application Data Unit (NADU) packet. The stream buffering circuitry 128 may be configured to communicate information about a first packet in the receiver buffer to be consumed (e.g., played out) and a playout delay until the contents of the first packet in the receiver buffer are consumed. It will be appreciated, however, that inclusion of this state information in a NADU is discussed merely by way of example and not by way of limitation. As such, the stream buffering circuitry 128 may be configured to include such state information in a receiver reporting message that may be used in addition to or in lieu of a NADU.

Figure 6:
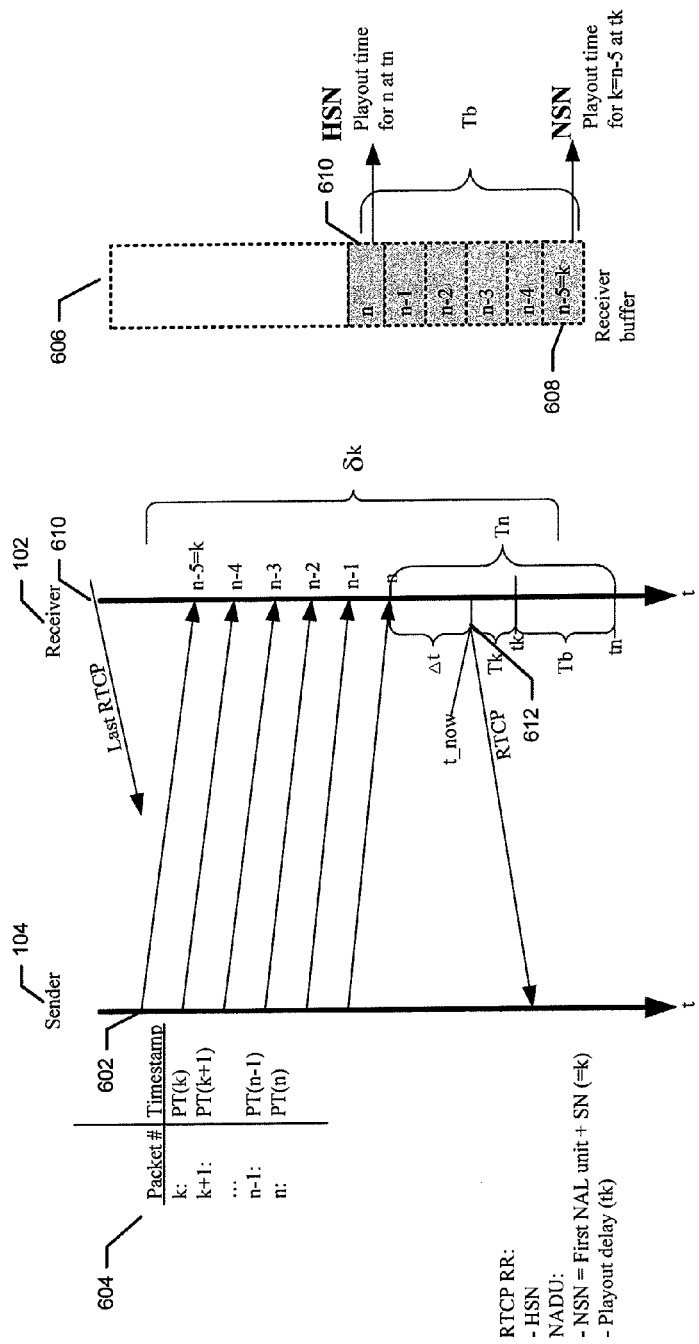
FIG. 6 illustrates an example signaling diagram for a media stream between a sending apparatus and a receiving apparatus according to an example embodiment.

Referring now to FIG. 6, FIG. 6 illustrates an example signaling diagram for a media stream transmitted from a sending apparatus 104 to a receiving apparatus 102 according to an example embodiment. In some example embodiments, the data stream control circuitry 138 may label individual packets of a data stream with sequence numbers and include timestamps in the packets so that the stream buffering circuitry 128 may know a time base for consuming (e.g., playing out) the information contained in received data packets. Thus, with reference to FIG. 6, the sending apparatus 104 may transmit the packet 602, which may have the sequence number "n–5" to the receiving apparatus 102.

The data stream control circuitry 138 may maintain a record of the sequence number and timestamp information for the data packets transmitted in a data stream for a period of time. This period of time may, for example, be selected to be larger than the time period between two reports from the receiving apparatus 102. Thus, for example, with reference to FIG. 6, the data stream control circuitry 138 may maintain a record such as the table 604, which may track the sequence numbers and timestamps of packets transmitted over a defined period. The data stream control circuitry 138 may additionally maintain a record of a size of the individual data packets transmitted in a data stream for a period of time. In some example embodiments, rather than storing information in a data structure, such as a table, the data stream control circuitry 138 may at least temporarily store a copy of the transmitted data packets, including their headers so that the data stream control circuitry 138 may extract sequence numbers, timestamps, and/or the like from the stored copies.

The data stream control circuitry 138 may learn about a state of the receiving apparatus 102 from one or more receiver reporting messages transmitted by the receiving apparatus 102. For example, the data stream control circuitry 138 may learn (e.g., from a NADU packet) which packet is the first queued packet in the receiver buffer. For example, with reference to FIG. 6, the packet 608 (the packet having the sequence number n–5=k) is the first queued packet in the receiver buffer 606. The data stream control circuitry 138 may further learn (e.g., from a NADU packet) which Network Abstraction Layer (NAL) unit, or other type of Application Data Unit (ADU), in the first queued packet is to be rendered next. The data stream control circuitry 138 may further learn (e.g., from a NADU packet) when rendering of the next NAL will occur.

The data stream control circuitry 138 may further learn of a Highest Sequence Number (HSN) of a data packet received by the receiving apparatus 102 from a receiver reporting message that may be transmitted by the receiving apparatus 102. For example, the stream buffering circuitry 128 may include the HSN in an RTCP RR, which may be reported to the sending apparatus 104 with a NADU packet. For example, with reference to the example of FIG. 6, the HSN received by the receiving apparatus 102 is the packet 610, having the sequence number "n."

If the data stream control circuitry 138 knows the first queued packet's sequence number (e.g., from a NADU packet) and the highest sequence number (e.g., from an RTCP RR packet), the data stream control circuitry 138 may reconstruct the contents of the receiver buffer (assuming the absence of packet losses). Accordingly, the data stream control circuitry 138 may know which packets are buffered in the receiver buffer.

Furthermore, based on locally maintained information (e.g., information maintained in the table 604 of the example of FIG. 6), the data stream control circuitry 138 may determine a duration of data packets in the receiver buffer by computing a difference in timestamps of the first packet in the receiver buffer and the last packet in the receiver buffer. In some example embodiments, the data stream control circuitry 138 may take into account the NAL unit reference when determining the duration of data packets in the receiver buffer. The duration of data packets in the receiver buffer may thus provide a total consumption (e.g., a total play out) time of the data contained in the receiver buffer. This total consumption time of the data contained in the receiver buffer may be denoted as "Tb."

However, this information alone might not be sufficient to enable the data stream control circuitry 138 to determine when a receiver buffer underflow may occur, which may impact the perceived quality of the data stream. For example, if the data stream comprises a media stream and a receiver buffer underflow occurs, play out of the media may be interrupted during a period in which no media packet is available for play out in the receiver buffer. In order to determine when a receiver buffer underflow may occur, the data stream control circuitry 138 may be configured to determine a total consumption (e.g., total play out) delay of the last packet (HSN) of a data stream received by the receiving apparatus 102. The value of the total consumption delay of the last received packet may be denoted as "Tn."

The total consumption delay of the last received packet may be determined at least in part of a function of how long consumption of the entire receiver buffer contents will take, Tb, as well as the consumption (e.g., play out) delay, Tk. The consumption delay Tk may define a delay until the next (portion of) the first packet in the queue is consumed (e.g., handed to the decoder for play out), which may, for example, be available from a NADU packet transmitted to the sending apparatus 104 by the receiving apparatus 102.

The total consumption delay of the last received packet may further be dependent upon an interval value, defining a time interval between reception of the last received packet by the receiving apparatus 102 and generation of a receiver reporting message sent to the sending apparatus 104 by the receiving apparatus 102. This time interval may be denoted as "Δt." The receiver reporting message may, for example, comprise a periodically generated receiver reporting message (e.g., an RTCP receiver report message), such as may be generated at predefined time intervals. Accordingly, the rate at which data packets are received by the receiving apparatus 102 may affect the magnitude of the time interval. For example, an inter-packet receipt interval may be smaller and the periodically generated receiver reporting message is more likely to be generated closer in time to the last received data packet. Contrastingly, if data packets are received at a lesser rate, the inter-packet receipt interval may be larger and the periodically generated receiver reporting message is more likely to be generated at a greater time interval following the time of receipt of the last received data packet than when the inter-packet receipt interval is smaller.

Referring again to FIG. 6, RTCP receiver report packets are scheduled to be sent periodically by the receiving apparatus 102. Two such RTCP receiver report packets, the last RTCP receiver report 610 and the RTCP receiver report 612 sent at t_now, are illustrated. The time interval between the RTCP receiver report 610 and RTCP receiver report 612 may comprise the defined period between generation of RTCP receiver reports. If the received packet rate were lower than that illustrated, then the value of Δt may be smaller than that for the example illustrated in FIG. 6. For example if only one packet in the time interval between two RTCP receiver reports (e.g., if only the packet arriving at the same time as packet n−3 in figure is received, and no packets n−5, n−4, n−2, n−1 and n are received either because of packet losses due to the network conditions or because the sender decides permanently or temporarily to use a different packetization strategy), then the value of Δt would be larger than it is in the example in FIG. 6, which illustrates a higher packet rate (6 packets in the same time interval).

The packet rate, and thus the value of Δt, may be dependent on network conditions (e.g., conditions of the transmission medium(s) used for transmission of a data stream from the sending apparatus 104 to the receiving apparatus 102). In this regard, network conditions may affect a delay time encountered by a data packet in transmission to the receiving apparatus 102. Accordingly, the value of Δt may be affected by a latency of a network (e.g., the network 106) over which the data stream is transmitted, a jitter experienced by data packets of the data stream during transmission over the network, packet losses in the network, or a rate at which data packets of the data stream are transmitted to the receiving apparatus 102, some combination thereof, and/or the like.

The stream buffering circuitry 128 may be configured to calculate Δt by determining the time interval between a first time at which a last data packet of a data stream was received prior to generation of a receiver reporting message and a second time at which the receiver reporting message was generated. The stream buffering circuitry 128 may be further configured to cause an indication of the calculated interval time to be sent to the sending apparatus 104. The stream buffering circuitry 128 may be configured to include the indication of the calculated interval time as an extension or parameter to an existing receiver reporting message, or may be configured to send the indication of the calculated interval time to the sending apparatus 104 in a dedicated message. Accordingly, by way of non-limiting example, the stream buffering circuitry 128 may be configured to signal the calculated interval time to the sending apparatus 104 in an RTCP receiver report packet, in an extended report packet, in an application-defined RTCP packet (APP packet), in an extension to an existing packet, as a parameter to an existing packet, in a dedicated message, in a dedicated packet, or the like.

The data stream control circuitry 138 may be configured to receive an indication of the interval time, Δt, sent by the receiving apparatus 102. The data stream control circuitry 138 may be further configured to use the interval time to determine a state of the receiver buffer of the receiving apparatus 102. In this regard, for example, the data stream control circuitry 138 may be configured to use the time interval to determine a total consumption delay of the last data packet in the receiver buffer. As described previously, the total consumption delay of the last data packet in the receiver buffer, Tn, may be calculated as a function of Δt, Tb, and Tk. Accordingly, the data stream control circuitry 138 may be configured to determine the total consumption delay of the last data packet in the receiver buffer as:

$$Tn = Tk + Tb + \Delta t \qquad [1]$$

The data stream control circuitry 138 may be configured to use the total consumption delay of the last data packet to determine when a receiver buffer underflow will occur. Accordingly, the data stream control circuitry 138 may use the total consumption delay of the last data packet as a measure to control transmission of the data stream to ensure that a receiver buffer underflow does not occur. For example, if a receiver buffer underflow will occur in less than a defined trigger time interval, the data stream control circuitry 138 may adjust transmission of the data stream to increase a rate at which data packets are received by the receiving apparatus 102, such as in accordance with a rate control algorithm. As an example, the data stream control circuitry 138 may increase a rate at which data packets of the data stream are transmitted by the sending apparatus 104. As another example, in embodiments wherein the data stream comprises a media stream, the data stream control circuitry 138 may have access to a plurality of copies of the media in various bit rates. The data stream control circuitry 138 may accordingly switch to streaming a lower quality (e.g., a lower bit rate) copy of the media at least temporarily such that media data packet size may be reduced and the reduced size media data packets may arrive at the receiving apparatus 102 more rapidly. Accordingly, a threshold quality of service may be maintained by ensuring a sufficient bit rate exists such that a receiver buffer underflow does not occur.

It will be appreciated that the data stream control circuitry 138 may be configured to determine receiver state information in addition to the total consumption delay of the last received packet. The data stream control circuitry 138 may be configured to factor this additional receiver state information into a rate control algorithm for controlling transmission of the data stream. In this regard, the data stream control circuitry 138 may, for example, use locally maintained information about sent packets and/or information sent to the sending apparatus 104 by the receiving apparatus 102 to determine an instantaneous transmission bit rate and its development over time. The data stream control circuitry 138 may use a calculated instantaneous transmission bit rate and an effective reception rate to separate queuing delay from RTT and detect latency of the network 106. The data stream control circuitry 138 may, for example, be configured to calculate queuing delay as:

Queuing delay=(Size of Packets sent in the last RTCP interval/transmisssion_rate)+(Size of Packets received in the last RTCP interval/reception_rate)     [2]

The data stream control circuitry 138 may then determine latency as:

Latency=RTT−Queuing delay     [3]

The data stream control circuitry 138 may be further configured to determine an exact receiver rate (goodput) and its evolution time. In this regard, the data stream control circuitry 138 may be configured to determine the exact receiver rate by using RTCP XR messages, or other similar messages, which may be sent by the receiving apparatus 102, and which may report which packets were received and/or were lost or dropped due to late arrivals. The data stream control circuitry 138 may additionally be configured to calculate a total delay experienced by the last packet received (HSN), which may be denoted as "D_HSN." The data stream control circuitry 138 may calculate D_HSN as a function of the total consumption delay of the last received packet. In this regard, D_HSN may be calculated by the data stream control circuitry 138 as:

D_HSN=$T_n$+RTT/2     [4]

The data stream control circuitry 138 may use D_HSN as an input for a rate control algorithm for controlling transmission of a data stream.

Figure 7:
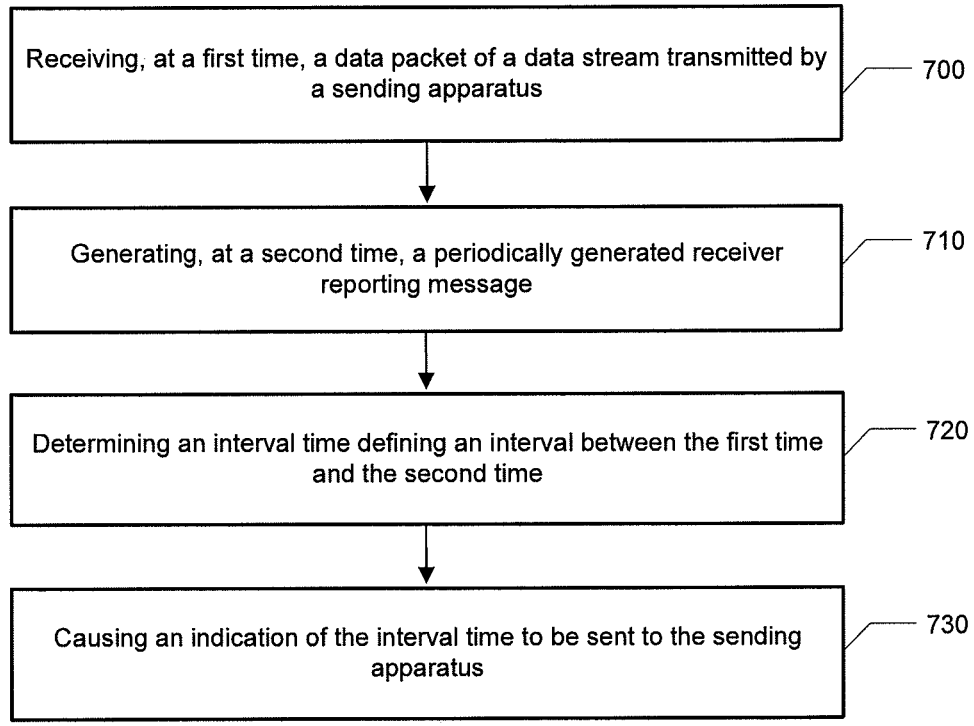
FIG. 7 illustrates a flowchart according to an example method for facilitating determination of a state of a receiver buffer according to an example embodiment.

Referring now to FIG. 7, FIG. 7 illustrates a flowchart according to an example method for facilitating determination of a state of a receiver buffer according to an example embodiment. In this regard, FIG. 7 illustrates operations that may be performed at the receiving apparatus 102. The operations illustrated in and described with respect to FIG. 7 may, for example, be performed by, with the assistance of, and/or under the control of one or more of the processor 120, memory 122, communication interface 124, user interface 126, or stream buffering circuitry 128. Operation 700 may comprise receiving, at a first time, a data packet of a data stream transmitted by a sending apparatus 104. The processor 120, memory 122, communication interface 124, and/or stream buffering circuitry 128 may, for example, provide means for performing operation 700. Operation 710 may comprise generating, at a second time, a periodically generated receiver reporting message. The receiver reporting message may, for example, comprise an RTCP receiver report message. The packet received at the first time may, for example, comprise a most recently received packet in the data stream prior to generation of the receiver reporting message. The processor 120, memory 122, communication interface 124, and/or stream buffering circuitry 128 may, for example, provide means for performing operation 710. Operation 720 may comprise determining an interval time defining an interval between the first time and the second time. The processor 120, memory 122, and/or stream buffering circuitry 128 may, for example, provide means for performing operation 720. Operation 730 may comprise causing an indication of the interval time to be sent to the sending apparatus 104. The processor 120, memory 122, communication interface 124, and/or stream buffering circuitry 128 may, for example, provide means for performing operation 730.

Figure 8:
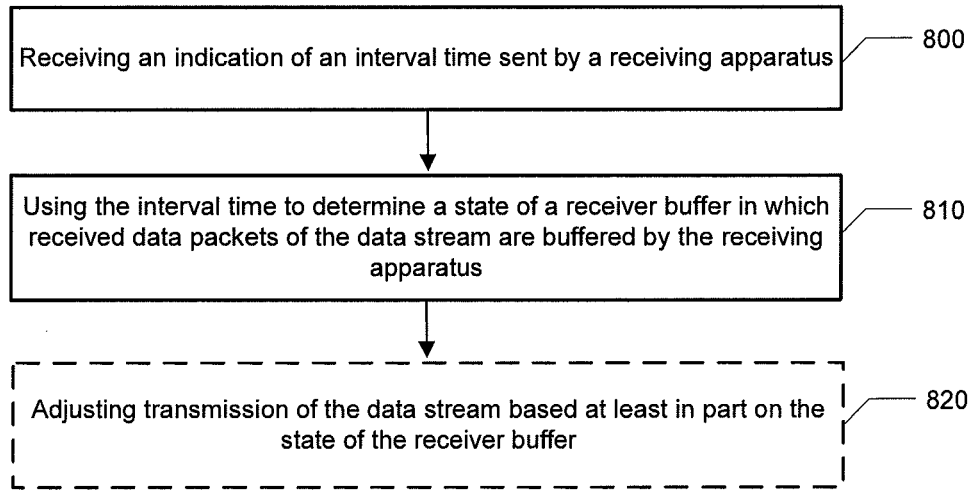
FIG. 8 illustrates a flowchart according to an example method for determining a state of a receiver buffer according to an example embodiment.

FIG. 8 illustrates a flowchart according to an example method for determining a state of a receiver buffer according to an example embodiment. In this regard, FIG. 8 illustrates operations that may be performed at the sending apparatus 104. The operations illustrated in and described with respect to FIG. 8 may, for example, be performed by, with the assistance of, and/or under the control of one or more of the processor 130, memory 132, communication interface 134, user interface 136, or data stream control circuitry 138. Operation 800 may comprise receiving an indication of an interval time sent by the receiving apparatus 102. The interval time may define an interval between a first time at which a data packet of a data stream was received by the receiving apparatus and a second time when a periodically generated receiver reporting message was generated by the receiving apparatus 102. The receiver reporting message may, for example, comprise an RTCP receiver report message. The packet received at the first time may, for example, comprise a most recently received packet in the data stream prior to generation of the receiver reporting message. The processor 130, memory 132, communication interface 134, and/or data stream control circuitry 138 may, for example, provide means for performing operation 800. Operation 810 may comprise using the time interval to determine a state of a receiver buffer in which received data packets of the data stream are buffered by the receiving apparatus 102. The processor 130, memory 132, and/or data stream control circuitry 138 may, for example, provide means for performing operation 810. The method may optionally further comprise operation 820, which may comprise adjusting transmission of the data stream based at least in part on the determined state of the receiver buffer. The processor 130, memory 132, communication interface 134, and/or data stream control circuitry 138 may, for example, provide means for performing operation 830.

Figure 9:
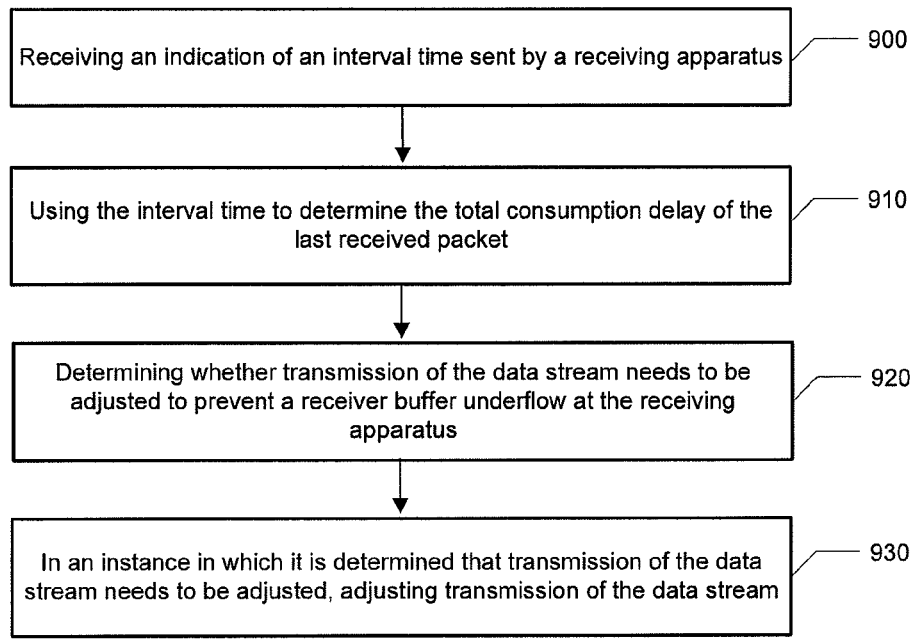
FIG. 9 illustrates a flowchart according to an example method for controlling transmission of a data stream based on a determined state of a receiver buffer according to an example embodiment.

FIG. 9 illustrates a flowchart according to an example method for controlling transmission of a data stream based on a determined state of a receiver buffer according to an example embodiment. In this regard, FIG. 9 illustrates operations that may be performed at the sending apparatus 104. The operations illustrated in and described with respect to FIG. 9 may, for example, be performed by, with the assistance of, and/or under the control of one or more of the processor 130, memory 132, communication interface 134, user interface 136, or data stream control circuitry 138. Operation 900 may comprise receiving an indication of an interval time sent by the receiving apparatus 102. The interval time may define an interval between a first time at which a data packet of a data stream was received by the receiving apparatus and a second time when a periodically generated receiver reporting message was generated by the receiving apparatus 102. The receiver reporting message may, for example, comprise an RTCP receiver report message. The packet received at the first time may, for example, comprise a most recently received packet in the data stream prior to generation of the receiver reporting message. The processor 130, memory 132, communication interface 134, and/or data stream control circuitry 138 may, for example, provide means for performing operation 900. Operation 910 may comprise using the interval time to determine the total consumption delay of the last received packet. The processor 130, memory 132, and/or data stream control circuitry 138 may, for example, provide means for performing operation 910. Operation 920 may comprise determining whether transmission of the data stream needs to be adjusted to prevent a receiver buffer underflow at the receiving apparatus 102. The processor 130, memory 132, and/or data stream control circuitry 138 may, for example, provide means for performing operation 920. In an instance in which it is determined at operation 920 that transmission of the data stream needs to be adjusted to prevent a receiver buffer overflow, operation 930 may comprise adjusting transmission of the data stream. The processor 130, memory 132, communication interface 134, and/or data stream control circuitry 138 may, for example, provide means for performing operation 900.

FIGS. 7-9 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 122 and/or in the memory 132) and executed by a processor in the computing device (for example, by the processor 120 and/or by the processor 130). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a receiving apparatus 102 and/or a sending apparatus 104) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, a receiving apparatus 102 and/or a sending apparatus 104) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 120 and/or processor 130) may provide all or a portion of the elements. In another embodiment, all or a portion of the elements may be configured by and operate under control of a computer program product. The computer program product for performing the methods of an example embodiment includes a computer-readable storage medium (for example, the memory 122 and/or memory 132), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
receiving, at a first time, a data packet of a data stream transmitted by a sending apparatus through a transmission medium, wherein receiving the data packet comprises buffering the data packet in a receiver buffer of the receiving apparatus;
generating, at a second time, a periodically generated receiver reporting message, wherein the receiver reporting message comprises at least an interval time, a registering of the receiving of the data packet and an identification of one or more lost packets;
causing transmission of the receiver reporting message;
determining, by a processor, the interval time defining an interval between the first time and the second time, wherein the interval time provides the sending apparatus with network information from which to determine a state of the receiver buffer; and
following transmission of the receiver reporting message including the interval time, the registering of the receiving of the data packet and the identification of one or more lost packets, receiving additional data packets of the data stream transmitted by the sending apparatus through the transmission medium with transmission of the additional data packets having been controlled based at least in part upon the state of the receiver buffer.

2. The method of claim 1, wherein the received packet comprises a packet most recently received in the data stream prior to generation of the receiver reporting message.

3. The method of claim 1, wherein the data packet comprises a media packet, and wherein the data stream comprises a media stream.

4. The method of claim 3, wherein media stream is a real time media stream.

5. The method of claim 1, wherein the receiver reporting message comprises a real time control protocol receiver report.

6. The method of claim 1, wherein a value of the interval time is affected by one or more of a latency of a network over which the data stream is transmitted, a jitter experienced by data packets of the data stream during transmission over the network, packet loss in the network, or a rate at which data packets of the data stream are transmitted by the sending apparatus.

7. The method of claim 1, wherein the interval time, in combination with additional information available to the sending apparatus, enables the sending apparatus to determine a state of a receiver buffer in which received data packets of the data stream are buffered, wherein the state is usable by the sending apparatus as a measure for controlling transmission of the data stream.

8. An apparatus comprising at least one processor and at least one memory storing computer program code, wherein the at least one memory and stored computer program code are configured, with the at least one processor, to cause the apparatus to at least:
receive, at a first time, a data packet of a data stream transmitted by a sending apparatus through a transmission medium, wherein the at least one memory and stored computer program code are configured, with the at least one processor, to cause the apparatus to receive the data packet by buffering the data packet in a receiver buffer of the receiving apparatus;
generate, at a second time, a periodically generated receiver reporting message, wherein the receiver reporting message comprises at least an interval time, a registering of the receiving of the data packet and an identification of one or more lost packets;
cause transmission of the receiver reporting message;
determine the interval time defining an interval between the first time and the second time, wherein the interval time provides the sending apparatus with network information from which to determine a state of the receiver buffer; and
following transmission of the receiver reporting message including the interval time, the registering of the receiving of the data packet and the identification of one or more lost packets, receive additional data packets of the data stream transmitted by the sending apparatus through the transmission medium with transmission of the additional data packets having been controlled based at least in part upon the state of the receiver buffer.

9. The apparatus of claim 8, wherein the received packet comprises a packet most recently received in the data stream prior to generation of the receiver reporting message.

10. The apparatus of claim 8, wherein the data packet comprises a media packet, and wherein the data stream comprises a media stream.

11. The apparatus of claim 10, wherein media stream is a real time media stream.

12. The apparatus of claim 8, wherein the receiver reporting message comprises a real time control protocol receiver report.

13. The apparatus of claim 8, wherein a value of the interval time is affected by one or more of a latency of a network over which the data stream is transmitted, a jitter experienced by data packets of the data stream during transmission over the network, packet loss in the network, or a rate at which data packets of the data stream are transmitted by the sending apparatus.

14. The apparatus of claim 8, wherein the interval time, in combination with additional information available to the sending apparatus, enables the sending apparatus to determine a state of a receiver buffer in which received data packets of the data stream are buffered, wherein the state is usable by the sending apparatus as a measure for controlling transmission of the data stream.

15. The apparatus of claim 8, wherein the apparatus comprises or is embodied on a mobile phone, the mobile phone comprising user interface circuitry and user interface software stored on one or more of the at least one memory; wherein the user interface circuitry and user interface software are configured to:
facilitate user control of at least some functions of the mobile phone through use of a display; and
cause at least a portion of a user interface of the mobile phone to be displayed on the display to facilitate user control of at least some functions of the mobile phone.

16. A computer program product comprising at least one computer-readable non-transitory medium having computer-readable program instructions stored therein, the computer-readable program instructions comprising:
program instructions configured to receive, at a first time, a data packet of a data stream transmitted by a sending apparatus through a transmission medium, wherein the program instructions configured to receive the data packet comprise program instructions configured to buffer the data packet in a receiver buffer of the receiving apparatus;
program instructions configured to generate, at a second time, a periodically generated receiver reporting message, wherein the receiver reporting message comprises at least an interval time, a registering of the receiving of the data packet and an identification of one or more lost packets;
program instructions configured to cause transmission of the receiver reporting message;
program instructions configured to determine the interval time defining an interval between the first time and the second time, wherein the interval time provides the sending apparatus with network information from which to determine a state of the receiver buffer; and
program instructions configured, following transmission of the receiver reporting message including the interval time, the registering of the receiving of the data packet and the identification of one or more lost packets, to receive additional data packets of the data stream transmitted by the sending apparatus through the transmission medium with transmission of the additional data packets having been controlled based at least in part upon the state of the receiver buffer.

17. A method comprising:
receiving a receiver reporting message sent by a receiving apparatus through a transmission medium, the receiver reporting message comprising an interval time defining an interval between a first time at which a data packet of a data stream was received by the receiving apparatus and a second time when a periodically generated receiver reporting message was generated by the receiving apparatus, as well as an identification of one or more lost packets;
using the interval time to determine, by a processor, a state of a receiver buffer in which received data packets of the data stream are buffered by the receiving apparatus; and
controlling transmission of data packets of the data stream to the receiving apparatus based at least in part upon the state of the receiver buffer.

18. The method of claim 17, wherein using the interval time to determine a state of the receiver buffer comprises using the interval time to determine a total consumption delay of the data packet.

19. The method of claim 18, wherein using the interval time to determine the total consumption delay of the data packet comprises deteiiuining the total consumption delay of the packet as a function of the interval time, a total consumption time of all data packets in the receiver buffer, and a delay time for consumption of a first queued data packet in the receiver buffer.

20. The method of claim 17, further comprising adjusting transmission of the data stream, based at least in part on the state of the receiver buffer, to ensure that a buffer underflow does not occur in the receiver buffer.

21. The method of claim 17, wherein using the interval time to determine a state of a receiver buffer in which received data packets of the data stream are buffered by the receiving apparatus comprises using the interval time in addition to information available from one or more of a receiver report, an extended report, or a next application data unit packet sent by receiving apparatus.

22. The method of claim 17, wherein the data packet received by the receiving apparatus comprises a data packet most recently received by the receiving apparatus in the data stream prior to generation of the receiver reporting message.

23. The method of claim 17, wherein the data packet received by the receiving apparatus comprises a media packet, and wherein the data stream comprises a media stream.

24. The method of claim 23, wherein media stream is a real time media stream.

25. The method of claim 17, wherein a value of the interval time is affected by one or more of a latency of a network over which the data stream is transmitted, a jitter experienced by data packets of the data stream during transmission over the network, packet loss in the network, or a rate at which data packets of the data stream are transmitted to the receiving apparatus.

26. An apparatus comprising at least one processor and at least one memory storing computer program code, wherein the at least one memory and stored computer program code are configured, with the at least one processor, to cause the apparatus to at least:
  receive a receiver reporting message sent by a receiving apparatus through a transmission medium, the receiver reporting message comprising an interval time defining an interval between a first time at which a data packet of a data stream was received by the receiving apparatus and a second time when a periodically generated receiver reporting message was generated by the receiving apparatus, as well as an identification of one or more lost packets;
  use the interval time to determine a state of a receiver buffer in which received data packets of the data stream are buffered by the receiving apparatus; and
  control transmission of data packets of the data stream to the receiving apparatus based at least in part upon the state of the receiver buffer.

27. The apparatus of claim 26, wherein the at least one memory and stored computer program code are configured, with the at least one processor, to cause the apparatus to use the interval time to determine a state of the receiver buffer at least in part by using the interval time to determine a total consumption delay of the data packet.

28. The apparatus of claim 27, wherein the at least one memory and stored computer program code are configured, with the at least one processor, to cause the apparatus to use the interval time to determine the total consumption delay of the data packet by determining the total consumption delay of the packet as a function of the interval time, a total consumption time of all data packets in the receiver buffer, and a delay time for consumption of a first queued data packet in the receiver buffer.

29. The apparatus of claim 26, wherein the at least one memory and stored computer program code are configured, with the at least one processor, to further cause the apparatus to adjust transmission of the data stream, based at least in part on the state of the receiver buffer, to ensure that a buffer underflow does not occur in the receiver buffer.

30. The apparatus of claim 26, wherein at least one memory and stored computer program code are configured, with the at least one processor, to further cause the apparatus to use the interval time in addition to information available from one or more of a receiver report, an extended report, or a next application data unit packet sent by receiving apparatus to determine the state of the receiver buffer in which received data packets of the data stream are buffered by the receiving apparatus.

31. The apparatus of claim 26, wherein the data packet received by the receiving apparatus comprises a data packet most recently received by the receiving apparatus in the data stream prior to generation of the receiver reporting message.

32. The apparatus of claim 26, wherein the data packet received by the receiving apparatus comprises a media packet, and wherein the data stream comprises a media stream.

33. The apparatus of claim 32, wherein media stream is a real time media stream.

34. The apparatus of claim 26, wherein a value of the interval time is affected by one or more of a latency of a network over which the data stream is transmitted, a jitter experienced by data packets of the data stream during transmission over the network, packet loss in the network, or a rate at which data packets of the data stream are transmitted to the receiving apparatus.

35. The apparatus of claim 26, wherein the apparatus comprises or is embodied on a mobile phone, the mobile phone comprising user interface circuitry and user interface software stored on one or more of the at least one memory; wherein the user interface circuitry and user interface software are configured to:
  facilitate user control of at least some functions of the mobile phone through use of a display; and
  cause at least a portion of a user interface of the mobile phone to be displayed on the display to facilitate user control of at least some functions of the mobile phone.

36. A computer program product comprising at least one computer-readable non-transitory medium having computer-readable program instructions stored therein, the computer-readable program instructions comprising:
  program instructions configured to receive a receiver reporting message sent by a receiving apparatus through a transmission medium, the receiver reporting message comprising an interval time defining an interval between a first time at which a data packet of a data stream was received by the receiving apparatus and a second time when a periodically generated receiver reporting message was generated by the receiving apparatus, as well as an identification of one or more lost packets; and
  program instructions configured to use the interval time to determine a state of a receiver buffer in which received data packets of the data stream are buffered by the receiving apparatus; and
  program instructions configured to control transmission of data packets of the data stream to the receiving apparatus based at least in part upon the state of the receiver buffer.

* * * * *